(12) United States Patent
Nostrand

(10) Patent No.: US 6,927,958 B2
(45) Date of Patent: Aug. 9, 2005

(54) ACTIVE TRANSIENT SUPPRESSION APPARATUS FOR POTENTIALLY EXPLOSIVE ENVIRONMENTS

(75) Inventor: Thomas Joseph Nostrand, Hinesburg, VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 425 days.

(21) Appl. No.: 10/313,485

(22) Filed: Dec. 5, 2002

(65) Prior Publication Data

US 2004/0125528 A1 Jul. 1, 2004

Related U.S. Application Data

(63) Continuation-in-part of application No. 10/040,768, filed on Jan. 7, 2002, now Pat. No. 6,714,393.

(51) Int. Cl.⁷ .................................................. H02H 9/00
(52) U.S. Cl. ...................................... 361/58; 361/93.9
(58) Field of Search ....................... 361/58, 91.4, 93.1, 361/93.7, 93.9, 100, 101

(56) References Cited

U.S. PATENT DOCUMENTS

| | | | | |
|---|---|---|---|---|
| 4,429,339 A | * | 1/1984 | Jaeschke et al. | 361/93.7 |
| 4,513,617 A | * | 4/1985 | Hayes | 73/313 |
| 5,045,963 A | * | 9/1991 | Hansen et al. | 361/87 |
| 5,198,957 A | * | 3/1993 | Welty et al. | 361/18 |
| 5,469,002 A | * | 11/1995 | Garrett | 307/150 |
| 5,654,859 A | * | 8/1997 | Shi | 361/66 |
| 6,278,381 B1 | * | 8/2001 | Bogert | 340/945 |
| 6,598,604 B1 | * | 7/2003 | Seakins | 128/203.17 |
| 6,714,393 B2 | * | 3/2004 | Nostrand | 361/58 |
| 2004/0047098 A1 | * | 3/2004 | Friedrichs et al. | 361/93.1 |
| 2004/0057181 A1 | * | 3/2004 | Marino et al. | 361/100 |
| 2004/0084608 A1 | * | 5/2004 | Maier | 250/221 |

* cited by examiner

Primary Examiner—Ronald Leja
(74) Attorney, Agent, or Firm—David R. Percio; Calfee, Halter & Griswold LLP

(57) ABSTRACT

Active transient suppression apparatus coupleable in series with an electrical pathway into a potentially explosive environment for limiting current, voltage and energy thereto comprises: an impedance element coupleable in series with the electrical pathway; a protection circuit comprising: at least one semiconductor element including a current conduction channel in series with the impedance element in the electrical pathway; and a driver circuit operative in response to a drive signal to switch the at least one semiconductor element to a non-conducting state; and a sense circuit coupled to the impedance element for sensing current conducted therethrough and generating a signal proportionally representative of the sensed current, the generated signal becoming the drive signal as it reaches a threshold level. The active transient suppression apparatus may be embodied in a system for determining a quantity of fuel in a container. The system comprises: at least one sensor disposed at the container; sensor excitation system coupled to each of the at least one sensor through an electrical pathway for providing an excitation signal thereto; and the active transient suppression apparatus disposed in series with each electrical pathway.

20 Claims, 3 Drawing Sheets

ACTIVE TRANSIENT SUPPRESSION APPARATUS FOR POTENTIALLY EXPLOSIVE ENVIRONMENTS

This application is a continuation-in-part of U.S. patent application Ser. No.: 10/040,768, entitled "Transient Suppression Apparatus For Potentially Explosive Environments", filed Jan. 7, 2002, and assigned to the same assignee as the instant application now U.S. Pat. No. 6,714,393.

BACKGROUND OF THE INVENTION

The present invention is directed to transient suppression devices, in general, and more particularly, to active transient suppression apparatus coupleable in series with an electrical pathway into a potentially explosive environment for limiting current, voltage and energy to levels considered safe for such environments, and to systems utilizing such apparatus.

An aircraft fuel measurement or indication system is an example of a system which utilizes transient suppression devices for limiting current, voltage and energy into a potentially explosive environment. In such a system, sensors are disposed at or in the fuel tank of the aircraft and a sensor excitation system remote from the tank generates excitation signals over electrical pathways to the sensors for measuring the quantity of fuel in the tank. Currently, there are many different types of sensors, comprising capacitive, inductive and/or resistive elements, for example, and different types of excitation signals needed to excite these sensors, like alternating current (AC), direct current (DC) and/or pulsed excitation signals, for example. Because of these differing system applications, the transient suppression solutions therefor need to accommodate differing levels of current, voltage and energy protection.

In addition, recent new requirements have been specified to insure aircraft safety, specifically associated with fuel tank safety which is considered a potentially explosive environment. These requirements apply to multiple threat and failure conditions that could impose unsafe levels of energy, voltage and current into the potentially explosive fuel tank environment if left unprotected. Existing transient suppression devices which are disposed in the electrical pathways use magnetic isolation, such as inductors and/or transformers and band pass circuit filtering, for example, to limit the current, voltage and energy parameters of the electrical pathways to the fuel tank. While an adequate solution, each transient suppression device needs to be tailored or designed for a specific application or group of similar applications in order to accommodate the level of current, voltage and energy protection required therefor while maintaining the level of sensitivity of an existing solution at normal operation taking into account parasitic components of the electrical pathways. Accordingly, there is no known existing transient suppression solution that may be universally used for the many different types of sensor/system applications and requirements therefor.

The present invention intends to overcome the drawbacks of the existing transient suppression devices and systems utilizing the same by offering substantially universal transient suppression apparatus which will provide the specified protection with different types of sensors and sensor excitation signaling and not be subject to the level of sensitivity that the existing solutions have at normal sensor measurement operation.

SUMMARY OF THE INVENTION

In accordance with one aspect of the present invention, active transient suppression apparatus coupleable in series with an electrical pathway into a potentially explosive environment for limiting current, voltage and energy thereto comprises: an impedance element coupleable in series with the electrical pathway; a protection circuit comprising: at least one semiconductor element including a current conduction channel in series with the impedance element in the electrical pathway; and a driver circuit for the at least one semiconductor element, the driver circuit operative in response to a drive signal to switch the at least one semiconductor element to a non-conducting state; and a sense circuit coupled to the impedance element for sensing current conducted therethrough and generating a signal proportionally representative of the sensed current, the generated signal becoming the drive signal of the driver circuit as the generated signal reaches a threshold level.

In accordance with another aspect of the present invention, a system for determining a quantity of fuel in a container comprises: at least one sensor disposed at the container for sensing a quantity of fuel in the container; sensor excitation system coupled to each of the at least one sensor through an electrical pathway for providing an excitation signal thereto; active transient suppression apparatus disposed in series with each electrical pathway for limiting current, voltage and energy to the container, the apparatus comprising: an impedance element coupled in series with the electrical pathway; a protection circuit comprising: at least one semiconductor element including a current conduction channel in series with the impedance element in the electrical pathway; and a driver circuit for the at least one semiconductor element, the driver circuit operative in response to a drive signal to switch the at least one semiconductor element to a non-conducting state; and a sense circuit coupled to the impedance element for sensing current conducted therethrough and generating a signal proportionally representative of the sensed current, the generated signal becoming the drive signal of the driver circuit as the generated signal reaches a threshold level.

DETAILED DESCRIPTION OF THE INVENTION

Figure 1:
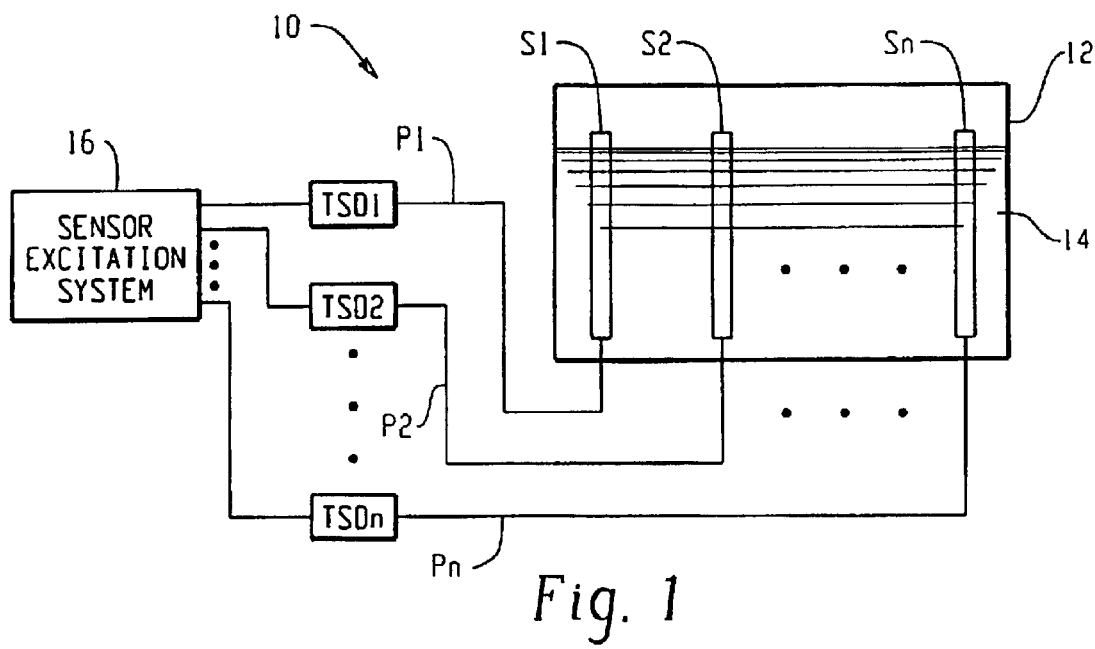
FIG. 1 is an exemplary system application of an embodiment of the present invention.

The present embodiment of the invention is described, by way of example, in connection with a fuel quantity measuring system for one or more aircraft fuel tanks such as that shown by the illustration of FIG. 1. However, it is understood that this fuel measurement system is but one example of a potentially explosive environment and that there are many other such environments that are just as suitable for embodying the present invention. Therefore, the transient suppression apparatus of the present invention should not be limited to any specific potentially explosive environment, but rather intended for use in all possible environments which are potentially explosive by nature.

Referring to FIG. 1, the system 10 as illustrated is intended for use on-board an aircraft which includes at least one fuel tank 12 having a quantity of aircraft fuel 14. At least one sensor is disposed at or in the fuel tank 12 for measuring the quantity of the fuel 14 therein. In the present embodiment, a plurality of sensors S1, S2, . . . , Sn, which may include capacitive elements are disposed in the fuel tank 12 for measuring the fuel quantity therein. While capacitive type sensors are used for describing the present embodiment, it is understood that inductive or ultrasonic pulse or a combination of sensor types may be used just as well. A conventional sensor excitation system 16 is disposed at a remote location from said fuel tank and is operative to generate excitation signals which are conducted to each sensor S1, S2, . . . , Sn over respectively corresponding electrical pathways P1, P2, . . . , Pn which are coupled respectively to the sensors S1, S2, . . . , Sn. The excitation signals may be any one of the group of signals comprising AC, DC and pulsed excitation signals depending on the type of sensor being excited thereby. Transient suppression devices TSD1, TSD2, . . . , TSDn are disposed respectively in series with each pathway P1, P2, . . . , Pn for limiting current, voltage and energy to the container 14 from each such pathway.

Figure 2:
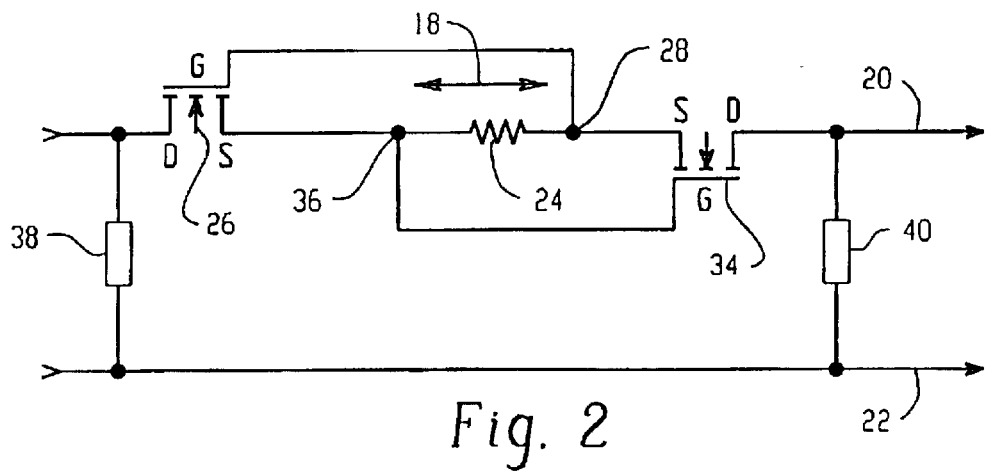
FIG. 2 is a circuit schematic of a transient suppression device suitable for embodying the present invention.

A suitable embodiment of a transient suppression device (TSD) in accordance with the present invention is shown in the circuit schematic of FIG. 2. The TSD of FIG. 2 is coupleable in an electrical pathway as described in connection with the exemplary embodiment of FIG. 1. In the present example, the electrical pathway includes a supply path 20 and a return path 22 over which current 18 may be conducted between the system 16 and sensor Si (i being 1, 2, . . . , or n). Referring to FIG. 2, an impedance element 24 is coupleable in series with the path 20 of the electrical path to conduct current into the electrically explosive fuel environment of the fuel tank 12. The current conducted to the tank 12 causes a voltage potential across the impedance element 24. In the present embodiment, the impedance element comprises a resistive element, but it is understood that other impedance elements or combinations thereof could also be used in certain applications. At least one semiconductor element 26, which may be a field effect transistor (FET), for example, is coupled to the impedance element 24 in series with the current path 18 upstream of the impedance element 24. In this embodiment, only one semiconductor element 26 is used. An embodiment using more than one semiconductor element or a plurality will be described herein below in connection with the circuit schematic of FIG. 4.

Figure 3:
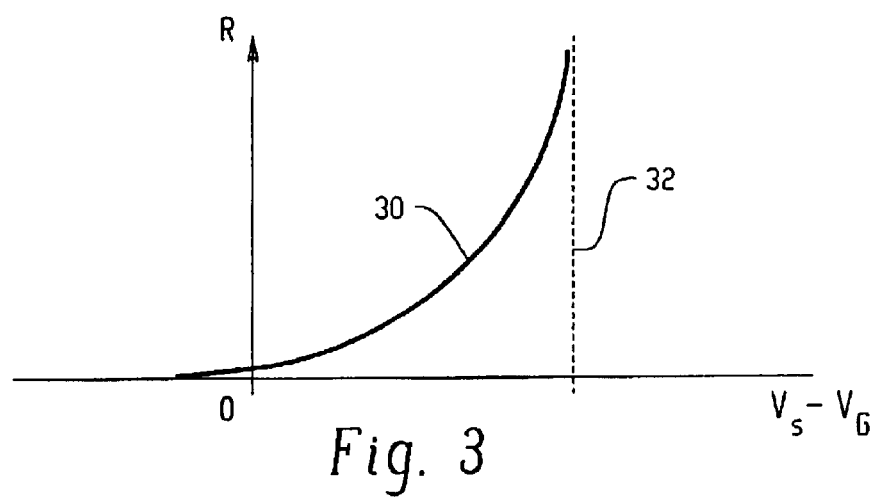
FIG. 3 is a graph illustrating the impedance characteristics of a semiconductor device suitable for use in the embodiment of FIG. 2.

More specifically, in FIG. 2, the FET 26 has its current channel S-D connected in series with the impedance element 24 in the path 20 and its gate G connected to a circuit node 28 at the downstream side of the impedance element 24. Accordingly, the voltage potential across the impedance element 24 is what governs the resistance of the current channel of the FET 26 which is in series with the electrical pathway. The resistance to voltage characteristics of the FET 26 are exemplified in the graph of FIG. 3. Referring to the graph of FIG. 3, note that as the channel to gate voltage of the FET (which is the voltage potential across the impedance element 24) varies at a first or positive polarity, the resistance of the current channel of the FET varies proportionately therewith as shown by the solid line 30 until it reaches a substantially open circuit condition at the voltage differential shown by the dashed line 32. However, at around zero differential voltage or differential voltages at a second or negative polarity, the resistance of the current channel remains substantial low. A positive polarity of voltage potential for the present example refers to current 18 in a direction from left to right or upstream to downstream through the impedance element 24 and a negative polarity of voltage potential would refer to current in the reverse direction.

Referring back to the schematic of FIG. 2, another at least one semiconductor element 34, which may also be an FET, for example, is coupled to the impedance element 24 in series with the current path 18 downstream of the impedance element 24 at node 28. Thus, the current channel S-D of the FET 34 is connected in series with the impedance element 24 in the path 20 and its gate G connected to a circuit node 36 at the upstream side of the impedance element 24. Accordingly, the voltage potential across the impedance element 24 also governs the resistance of the current channel of the FET 34 which is in series with the electrical pathway. The resistance to voltage characteristics of the FET 34 may also be exemplified by the graph of FIG. 3 except now the polarity is reversed. That is, as the channel to gate voltage of the FET 34 (which is the voltage potential across the impedance element 24) varies at a second or negative polarity, the resistance of the current channel of the FET 34 varies proportionately therewith as shown by the solid line 30 until it reaches a substantially open circuit condition at the voltage differential shown by the dashed line 32. However, at around zero differential voltage or differential voltages at a first or positive polarity, the resistance of the current channel remains substantial low.

Also, in the embodiment of FIG. 2, one or more series connected voltage potential surge suppression elements 38 and 40 may be coupled in parallel with the electrical pathway across paths 20 and 22 upstream and downstream of the TSD circuit described herein above, respectively. The surge suppression elements 38 and 40 may be of the type manufactured by Microsemi bearing model number SMCJ170CA, for example., which are capable of protecting the TSD against voltage surges of up to approximately 200 volts each or 600 volts if three (3) in series are used, for example. Also, the semiconductor elements 26 and 34 may be metal oxide semiconductor field effect transistors (MOSFETs) of the type manufactured by Infineon bearing model number BSP-149, for example, which are capable of withstanding blocking voltages of approximately 200 volts each, for example.

Prior to installation of the TSD into its designated electrical pathway, the impedance element 24 is selected based on the particular sensor and sensor excitation signal which it will accommodate under normal operating conditions. This impedance should be small enough so as to effect a voltage drop across element 24 which does not affect appreciably the sensor measurement under normal operating conditions, but large enough to effect a voltage drop which will maintain the transistors 26 and 34 biased "on" under such conditions. For most applications, a resistance of on the order of one hundred ohms (100Ω), for example, may be used for the impedance element. When biased "on", the transistors 26 and 34 each provide a small series resistance in the current pathway as illustrated by the exemplary characteristics of FIG. 3. The series resistance of the transistors 26 and 34 and the resistance of the element 24 should be selected so as to not affect the performance of the sensor measurements or system operation under normal operating conditions.

When a TSD is disposed in an electrical pathway to a potentially explosive environment, if an external threat, such as a lightning induced voltage, electromagnetic interference (EMI) induced energy or the like, for example, or a failure of the electrical pathway to a power line which may be 115V, 400 Hz or 28 VDC, for example, or a latent failure condition that may emulate a current or voltage path to ground potential in the fuel tank should occur, the TSD will regulate and limit the current, voltage and energy to the environment to specified safe levels. During a threat or failure condition, an increase in the current 18 through the element 24 will cause a voltage potential across element 24 that governs at least one of the transistors 26 and 34 to start to shut "off", i.e. become blocking or non-conducting, which increases the series resistance thereof to the current path. Under such abnormal conditions, the transistors 26 and 34 act as non-linear resistors which regulate the current into the potentially explosive environments, or in the case of the present embodiment, the aircraft fuel tank 14. This current into the potentially explosive environment remains limited to safe levels by the TSD even in the face of increasing external voltage or current threats. For example, the energy and current may be limited to less than 200 microjoules ($\mu$J) of energy and 20 milliamps (mA) of current into the fuel tank or environment in some cases. Also, each transistor is capable of blocking voltages of on the order of 200 volts, for example. Abnormal voltage may be also limited by the surge suppression elements 38 and 40 to voltage levels of 600 volts, for example, where three such devices in series are used.

The TSD operates in response to threats and failures inducing increasing current 18 of both positive and negative polarities. For example, as the current 18 is increased abnormally with the first or positive polarity, the series resistance of transistor 26 is governed to increase by the polarity of the voltage potentially induced across the element 24 and thus, regulates current 18 to safe levels. The resistance of the transistor 34 remains at a relatively low value because the voltage potential across the element 24 governs the transistor 34 with the reverse polarity to that of the transistor 26 (refer to FIG. 2). Also, as the current 18 is increased abnormally with the second or negative polarity, the series resistance of transistor 34 is governed to increase by the polarity of the voltage potential across element 24 and thus, regulates current 18 to safe levels. The resistance of the transistor 26 remains at a relatively low value because the voltage potential across the element 24 governs the transistor 26 with the reverse polarity to that of the transistor 34 (refer to FIG. 2).

Note that each of the transistors 26 and 34 of the embodiment of FIG. 2 is intended to represent one or more semiconductor elements each of which being operative to vary its blocking resistance to current 18 of the corresponding electrical pathway in response to a variation of the voltage potential across the impedance element 24. The blocking resistance of the at least one semiconductor element represented by element 26 is varied by a voltage potential across the element 24 of a first or positive polarity and the blocking resistance of the at least one semiconductor element represented by element 34 is varied by a voltage potential across the element 24 of a second or negative polarity. A suitable embodiment for a TSD having a plurality of semiconductor elements both upstream and downstream of the impedance element 24 is illustrated in the circuit schematic of FIG. 4.

Figure 4:
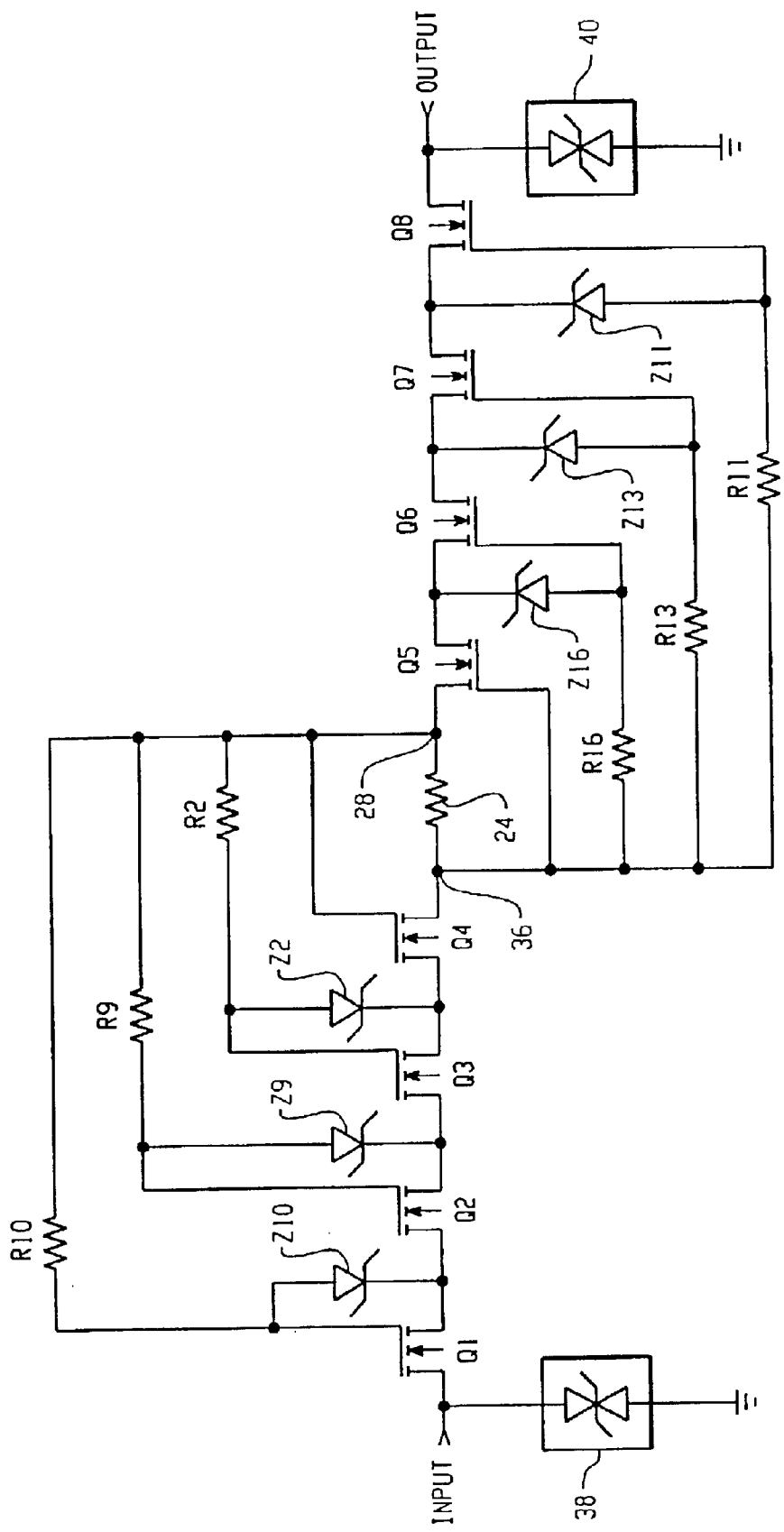
FIG. 4 is circuit schematic of an alternate transient suppression device suitable for embodying the present invention.

Referring to FIG. 4, the plurality of semiconductor elements represented by transistor 26 comprises field effect transistors Q1–Q4 which have their current channels coupled in series upstream of the element 24 between the input of the path 20 of the TSD and the node 36, Q4 being coupled to node 36 and Q1 being coupled to the input node. The gate of transistor Q4 is coupled directly to node 28 and the gates of transistors Q1 through Q3 are coupled to node 28 through resistors R10, R9 and R2, respectively. Voltage potential limiting circuit elements Z10, Z9 and Z2 are coupled respectively, anode-to-cathode, between the gates and current channels of transistors Q1 through Q3. The circuit elements Z10, Z9 and Z2 may be conventional transient suppression type zener diodes capable of limiting voltage potentials of on the order of fifteen (15) volts, for example. Also in FIG. 4, the plurality of semiconductor elements represented by transistor 34 comprises field effect transistors Q5–Q8 which have their current channels coupled in series downstream of the element 24 between the output of the path 20 of the TSD and the node 28, Q5 being coupled to node 36 and Q8 being coupled to the output node. The gate of transistor Q5 is coupled directly to node 36 and the gates of transistors Q6 through Q8 are coupled to node 36 through resistors R16, R13 and R11, respectively. Voltage potential limiting circuit elements Z16, Z13 and Z11 are coupled respectively, anode-to-cathode, between the gates and current channels of transistors Q6 through Q8. The circuit elements Z16, Z13 and Z11 may be conventional transient suppression type zener diodes capable of limiting voltage potentials of on the order of fifteen (15) volts, for example.

Accordingly, the channel resistances of transistors Q1–Q4 which may be MOSFETs, for example, are operational to block abnormal currents 18 which induce a positive polarity voltage potential across element 24 and thus, block abnormal voltages of a positive polarity and limit the current, voltage and energy to the potentially explosive environment under adverse threat and failure conditions. Likewise, the channel resistances of transistors Q5–Q8 which also may be MOSFETs, for example, are operational to block abnormal currents 18 which induce a negative polarity voltage potential across element 24 and thus, block abnormal voltages of a negative polarity and limit the current, voltage and energy to the potentially explosive environment under adverse threat and failure conditions. The zener-resistor pairs Z10-R10, Z9-R9 and Z2-R2 protect the channel to gate junctions of transistors Q1, Q2 and Q3 respectively, by limiting the voltage potential thereacross. Similarly, zener-resistor pairs Z16-R16, Z13-R13 and Z11-R11 protect the channel to gate junctions of transistors Q6, Q7 and Q8 against over voltage in the same manner. In an operating environment in which a large amount of EMI is anticipated, some additional EMI filtering may be added to the transient suppression circuit at both the input and output thereof.

Figure 5:
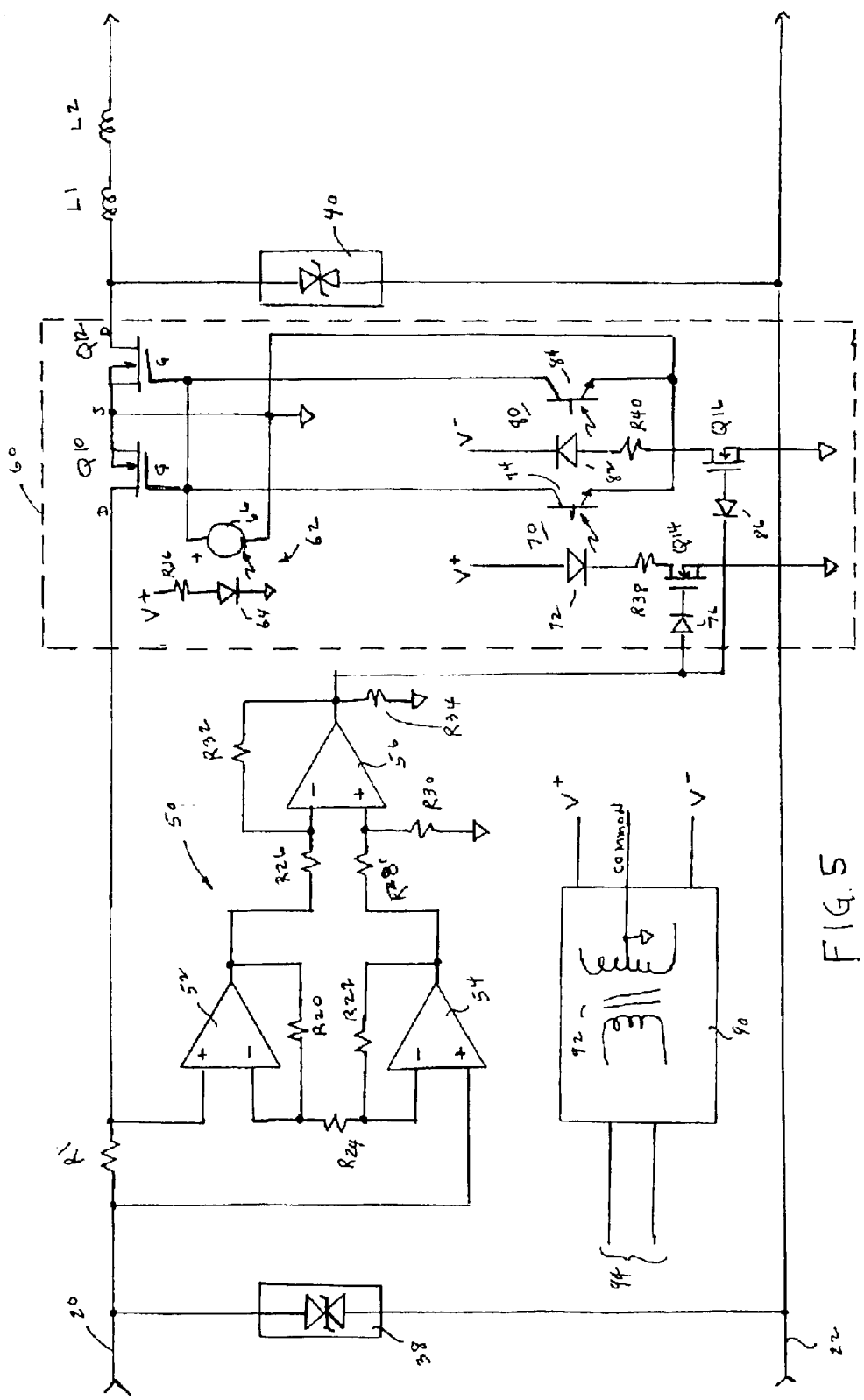
FIG. 5 is a circuit schematic of an active transient suppression device suitable for embodying another aspect of the present invention.

While the TSD of the present invention has been described herein above in connection with passive circuit embodiments, it is understood that, in the alternative, an active circuit embodiment of the TSD may work just as well. Such an active circuit embodiment is shown by way of example in the circuit schematic of FIG. 5. In this alternate embodiment, the current sense impedance element coupleable in series with the supply path 20 is a resistor R1 which may be on the order of two ohms (2$\Omega$), for example. In series with R1 along the path 20 is at least one semiconductor element. In the present embodiment, the at least one semiconductor element comprises two enhancement mode MOSFETs Q10 and Q12 connected together through their sources S. That is, both source to drain (S-D) current channels of Q10 and Q12 are in series with resister R1 along the path 20. The same or similar surge suppression elements 38 and 40 may be connected across the paths 20 and 22 at the input and output, respectively.

The voltage across R1 which is proportional to the current conducted therethrough is sensed by a sense circuit shown at 50. In the present embodiment, the sense circuit 50 comprises a configuration of three amplifiers 52, 54 and 56 which may be operational amplifiers, for example. More specifically, the upstream side of R1 is coupled to a non-inverting (+) input of amplifier 54 and the downstream side of R1 is coupled to the non-inverting (+) input of amplifier 52. Resisters R20 and R22 are coupled between the output and inverting (−) input of amplifiers 52 and 54, respectively. A resistor R24 is coupled between the inverting inputs of amplifiers 52 and 54. Resistors R20 and R22 may each be on the order of 1 K Ω, and R24 may be approximately 200 Ω, for example.

The outputs of amplifiers 52 and 54 are coupled to inverting and non-inverting inputs of amplifier 56, through resistors R26 and R28, respectively. A resistor R30 may couple the non-inverting input of amplifier 56 to an isolated common which will be more fully explained herein below. This isolated common is shown throughout the schematic of FIG. 5 by an open arrow symbol. A resistor R32 is coupled between the output and inverting input of amplifier 56. For the present embodiment, resistors R26 and R28 may each be on the order of 200 Ω and resistors R30 and R32 may each be approximately 10K Ω. The overall closed gain of the three amplifier configuration may be 250, for example. The output of amplifier 56 drives the gates of two MOSFETs as will become more evident from the following description. Since these gate input are considered capacitive loads, the output of amplifier 56 is coupled to ground through a 1 K Ω resistor R34 for stabilization.

The circuitry within the dashed line block 60 is considered the protection or voltage blocking circuits which include MOSFET switches Q10 and Q12. The switch Q10 is for blocking positive going voltages and switch Q12 is for blocking negative going voltages which will become more fully understood from the following description. Under normal conditions, each switch Q10 and Q12 is biased "on" and represents a small series resistance in the path 20, which may be less than 1 Ω, for example. Thus, the total series resistance of R1, Q10 and Q12, which is less than 4Ω, in the path 20 is not expected to affect the performance of the fuel quantity measurement system as described in connection with FIG. 1, supra.

In the present embodiment, the switches Q10 and Q12 are biased "on". To bias the switches Q10 and Q12 "on", a photovoltaic driver cell 62 is coupled between the gates of Q10 and Q12 and their common source node S which is coupled to the isolated common. The driver cell 62, which may be of the type manufactured by Dionics Inc. bearing model no. DG11630DD, for example, comprises a light emitting diode 64 which is driven from a regulated V+ supply through a resistor R36 to the isolated common. The diode 64 provides a constant light source to a photovoltaic cell 66 which in turn produces a bias voltage, which may be approximately 10V, for example, across the G-S junctions of Q10 and Q12 to keep them biased "on".

The switch Q10 is driven by an optocoupler circuit 70 which comprises a light emitting diode 72 and a phototransistor 74 which is coupled collector to emitter across the gate to source junction of Q10. The diode 72 of the circuit 70 is coupled between the V+ supply and isolated common, and in series with diode 72 is a resistor R38 and a MOSFET Q14, the gate of which being coupled to the output of amplifier 56 through a forward biased diode 76. Likewise, switch Q12 is driven by another optocoupler circuit 80 which comprises a light emitting diode 82 and a phototransistor 84 which is coupled collector to emitter across the gate to source junction of Q12. The diode 82 of the circuit 70 is coupled between a V− supply and isolated common, and in series with diode 82 is a resistor R40 and a MOSFET Q16, the gate of which being coupled to the output of amplifier 56 through a reversed biased diode 86.

Since this alternate embodiment is an active TSD, then some isolated source of power is needed to operate the active circuitry thereof. In the present embodiment, a switching voltage regulator 90 comprising an isolation transformer 92 converts voltage from an input source over power lines 94 to floating and regulated supply voltages of V+ and V− which are derived from the secondary of the isolation transformer 92. The isolated common may be provided from a center tap of the secondary of transformer 92. The V+ and V− voltages which may be +15V and −15V, respectively, for example, are coupled to each of the amplifier circuits 52, 54 and 56 for the powering thereof. The other circuits of the active TSD embodiment being powered by the supply voltages are clearly marked in the schematic diagram of FIG. 5.

If an external threat, such as a lightning induced voltage, EMI induced energy or a failure of the system wiring to a power source, like a 115V, 400 Hz power line or 24VDC power line, for example, occurs or if a latent condition occurs in the fuel tank that emulates a current path or voltage path to ground potential, the active TSD circuit will interrupt the energy and current over path 20 to less than 50 μJ of energy and 25 ma RMS of current. More specifically, at the onset of a threat, an increase in current in path 20 occurs and induces a proportional increase in voltage across resistor R1 which is sensed and amplified by the sense circuit 50. As this amplified voltage rises, it reaches a threshold level sufficient to drive one or the other of the switches Q10 or Q12 "off" or open circuited which in effect appears as a large series resistance to current in path 20 between the threat and the in-tank components as shown in FIG. 1.

More particularly, threat induced positive going currents in path 20 are sensed by sense circuit 50. As the voltage at the output of amplifier 56 rises positively in proportion to the sensed current across R1, it reaches a first threshold level sufficient to drive MOSFET Q14 "on" through diode 76. Note that since diode 86 is reversed biased, MOSFET Q16 remains "off". With Q14 "on", current is caused to flow through diode 72 which emits light to turn photo-transistor 74 "on". When "on", photo-transistor 74 shunts the S-G bias voltage of Q10 to substantially zero, thus, switching Q10 "off". Switch Q10 will remain "off" or in the current blocking state until the current through R1 returns to normal operational levels.

Likewise, threat induced negative going currents in path 20 are sensed by sense circuit 50. As the voltage at the output of amplifier 56 rises negatively in proportion to the sensed current across R1, it reaches a second threshold level sufficient to drive MOSFET Q16 "on" through diode 86. Note that since diode 76 is forward biased, MOSFET Q14 remains "off". With Q16 "on", current is caused to flow through diode 82 which emits light to turn photo-transistor 84 "on". When "on", photo-transistor 84 shunts the S-G bias voltage of Q12 to substantially zero, thus, switching Q12 "off". Switch Q12 will remain "off" or in the current blocking state until the current through R1 returns to normal operational levels.

In the present embodiment, each switch Q10 and Q12 is capable of blocking approximately 500V when nonconducting. Threat induced voltages greater than 500V will be clamped by the voltage surge suppression elements 38 and 40. The sense circuit and switch response times are on the order of 500–800 nsec., for example, and once Q10 or Q12 is switched "off", threat current levels are disrupted from entering the potentially explosive environment or fuel tank. Threats which occur faster than the switching and sense circuit response times may be limited by inductors L1 and L2 which are disposed in series with path 20. Series inductors L1 and L2 which may each be around 33 $\mu$H, for example, limits the current in path 20 until a switch Q10 or Q12 starts to turn "off". In addition, surge suppression element 40, limits the voltage at the output of path 20 to less than 15 volts, for example.

Note that in order to change the threat current level threshold in the present embodiment, the value of the sense resistor R1 or the voltage gain of the sense circuit 50 may be modified. Even the switch threshold level of the gate control circuits to Q10 and Q12 may be modified for such purposes. Also, in some cases, it may be desirable to use more than a single blocking circuit 60 in series connection in the path 20 for safety and redundancy purposes. Moreover, a power supply supervisory circuit may be included in the foregoing described embodiment to ensure the path 20 is open circuited when circuit power is "off" or below a certain supply voltage level.

While the present invention has been described by way of example in connection with one or more embodiments herein above, it is understood that it should not be limited in any way, shape or form to such embodiments. Rather the present invention should be construed in breadth and broad scope in accordance with the recitation of the appended claims.

What is claimed is:

1. Active transient suppression apparatus coupleable in series with an electrical pathway into a potentially explosive environment for limiting current, voltage and energy thereto, said apparatus comprising:
    an impedance element coupleable in series with said electrical pathway;
    a protection circuit comprising:
        at least one semiconductor element including a current conduction channel in series with said impedance element in said electrical pathway; and
        a driver circuit for said at least one semiconductor element, said driver circuit operative in response to a drive signal to switch said at least one semiconductor element to a non-conducting state; and
    a sense circuit coupled to said impedance element for sensing current conducted therethrough and generating a signal proportionally representative of said sensed current, said generated signal becoming said drive signal of the driver circuit as said generated signal reaches a threshold level.

2. The apparatus of claim 1 wherein the impedance element comprises a resistive element; and wherein the sense circuit comprises an amplifier circuit coupled to the resistive element for sensing the voltage across the resistive element as a measure of the current conducted therethrough.

3. The apparatus of claim 1 wherein the at least one semiconductor element comprises first and second semiconductor elements, each of the first and second semiconductor elements including a current conduction channel in series with the impedance element and electrical pathway; and wherein the driver circuit includes a driver circuit for each of said first and second semiconductor elements, each driver circuit operative in response to the drive signal to switch its respective semiconductor element to the non-conducting state.

4. The apparatus of claim 3 wherein the first semiconductor element comprises a field effect transistor which is switched to the non-conducting state by its corresponding driver circuit in response to the generated signal of a first polarity reaching a first predetermined threshold level; and wherein the second semiconductor element comprises a field effect transistor which is switched to the non-conducting state by its corresponding driver circuit in response to the generated signal of a second polarity reaching a second threshold level.

5. The apparatus of claim 4 wherein the field effect transistors of the first and second semiconductor elements are metal oxide semiconductor field effect transistors operative to withstand a high voltage potential thereacross in the non-conducting state.

6. The apparatus of claim 3 including a bias circuit coupled to the first and second semiconductor elements for generating a signal to bias the first and second semiconductor elements to a conducting state; and wherein each driver circuit is operative in response to the drive signal to overcome said bias signal and switch its corresponding semiconductor element to the non-conducting state.

7. The apparatus of claim 6 wherein the bias circuit includes a photovoltaic driver cell for generating the bias signal.

8. The apparatus of claim 6 wherein each driver circuit includes an optical coupler circuit responsive to the drive signal to shunt the bias signal.

9. The apparatus of claim 1 including first and second voltage potential surge suppression elements coupled in parallel with the electrical pathway upstream and downstream, respectively, of the at least one semiconductor element.

10. The apparatus of claim 1 including an inductive element coupled in series with the current conduction channel of the at least one semiconductor element.

11. The apparatus of claim 1 including a transformer circuit coupled to a power source for generating isolated voltage potentials for powering the protection and sense circuits.

12. A system for determining a quantity of fuel in a container, said system comprising:
    at least one sensor disposed at said container for sensing a quantity of fuel in the container;
    sensor excitation system coupled to each of said at least one sensor through an electrical pathway for providing an excitation signal thereto;
    active transient suppression apparatus disposed in series with each said electrical pathway for limiting current, voltage and energy to the container, said apparatus comprising:
        an impedance element coupled in series with said electrical pathway;
        a protection circuit comprising:
            at least one semiconductor element including a current conduction channel in series with said impedance element in said electrical pathway; and
            a driver circuit for said at least one semiconductor element, said driver circuit operative in response to a drive signal to switch said at least one semiconductor element to a non-conducting state; and
        a sense circuit coupled to said impedance element for sensing current conducted therethrough and generating a signal proportionally representative of said sensed current, said generated signal becoming said drive signal of the driver circuit as said generated signal reaches a threshold level.

13. The system of claim 12 being disposed on an aircraft; and wherein the container comprises an aircraft fuel tank and the fuel comprises aircraft fuel.

14. The system of claim 12 wherein the sensor excitation system is operative to generate an excitation signal of the group of signals comprising AC, DC and pulsed excitation signals to excite a sensor at the container; and wherein each active transient suppression apparatus is adaptable to accommodate any excitation signal of said group.

15. The system of claim 12 wherein the active transient suppression apparatus is operative to limit the current, voltage and energy to the container caused by threats to the system to within levels considered safe.

16. The system of claim 12 wherein the active transient suppression apparatus is operative to limit the current, voltage and energy to the container caused by failures of the system to within levels considered safe.

17. The system of claim 12 wherein the active transient suppression apparatus is disposed in series with each electrical pathway in close proximity to the container.

18. The system of claim 12 wherein the active transient suppression apparatus includes first and second voltage potential surge suppression elements coupled in parallel with the electrical pathway upstream and downstream, respectively, of the at least one semiconductor element.

19. The system of claim 12 wherein the active transient suppression apparatus includes an inductive element coupled in series with the current conduction channel of the at least one semiconductor element.

20. The system of claim 12 including a transformer circuit coupled to a power source for generating isolated voltage potentials for powering the protection and sense circuits of the active transient suppression apparatus.

* * * * *